Sept. 18, 1945.    M. M. MARISIC    2,384,946
HYDROGEL PELLETS
Filed April 24, 1945
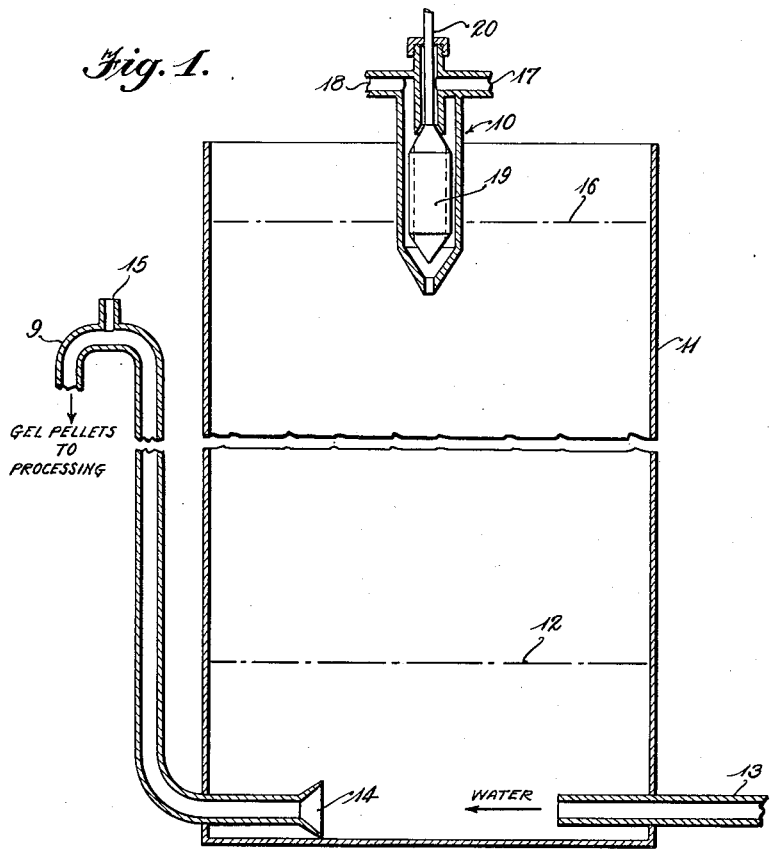
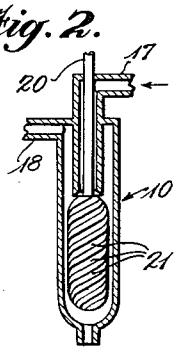
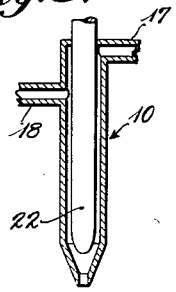
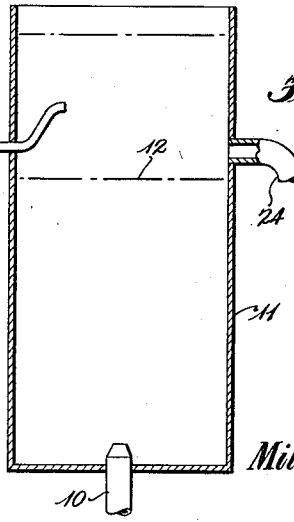
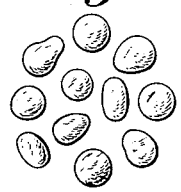
Inventor
Milton M. Marisic Patented Sept. 18, 1945

2,384,946

UNITED STATES PATENT OFFICE 2,384,946

HYDROGEL PELLETS

Milton M. Marisic, Northfield, Ill., assignor to Socony-Vacuum Oil Company, Incorporated, a corporation of New York Application April 24, 1945, Serial No. 590,071

20 Claims. (Cl. 252—235)

This invention is directed to a novel form of inorganic gels characterized by smooth hard surfaces and high resistance to attrition loss and to the method of preparing such products. This application is a continuation-in-part of my prior copending application Serial No. 483,993, filed April 22, 1943, which is in turn a continuation-in-part of my application Serial No. 461,454, filed October 9, 1942.

I have found that gels of various inorganic oxides may be prepared in novel form having high structural strength and high resistance to attrition losses by causing a hydrosol to set to the corresponding hydrogel in a form assumed under the influence of surface tension against a fluid medium which is not miscible with the hydrosol. That medium may contain components which can be dissolved therefrom by the hydrosol but it must be of such character that a definite interface exists between the hydrosol and the fluid gelation medium which interface exists through the gelations thus causing the gel to form in a generally spheroidal shape having bounding surfaces corresponding to the interface. The shape of the hydrogel as set will vary greatly with a number of factors as discussed hereinafter but, in general, the hydrogel pellets and the dried gel pellets obtained by drying the hydrogel will be smooth surfaces made up of smooth curves. Such shapes are referred to herein as spheroid; that is, spheres or forms somewhat similar to spheres as oblate spheroids, prolate spheroids and the like. It is an important aspect of my invention that the hydrosol sets to a true hydrogel as distinguished from gelatinous precipitates. The latter are formless solid masses separating out from a liquid portion of the sol although they contain large portions of liquid. When true hydrogels are formed, the entire hydrosol sets to a firm mass which occupies all the space previously occupied by the sol although liquor may exude therefrom by syneresis.

The present compositions may include any of the oxides which will form true hydrogels and the final products may be used for any purpose to which said hydrogels are adapted such as drying of gases by adsorption, water softening zeolites, catalysts, etc. The compositions are particularly well adapted to catalytic uses such as the catalytic conversion of hydrocarbons.

It is known that many operations for the conversion of hydrocarbon materials to other hydrocarbon materials of differing physical and/or chemical properties may be carried out catalytically. Most of these are carried out by contacting the hydrocarbon, usually in vapor form and at high temperature, with a contact mass composed of particles which themselves have a catalytic effect, or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic dehydrogenation, hydrogenation, polymerization, alkylation, reforming, aromatization, desulfurizing, partial oxidation and similar conversions of hydrocarbon materials. The method of operation and apparatus herein disclosed are applicable to all such conversions. Of these operations, the vapor phase cracking of heavy hydrocarbons to gasoline is typical, and this specification will hereinafter discuss such operations as exemplary, without, however, intending to be limited thereby or thereto except by such limits as may appear in the claims.

Such catalytic processes generally make use of reaction chambers containing a fixed body of catalyst or contact mass, through which the reaction mixture is passed, and in which, after the reaction has slowed down to an uneconomic point, the contact mass is regenerated in situ. Such processes are not continuous, and only attain continuity by the provision of numerous reaction chambers which are alternately placed on stream and on regeneration. Likewise, it is difficult to maintain constant quantity and quality of product without numerous chambers and intricate scheduling, due to the progressively decreasing activity of the catalyst. This same feature, with apparatus limitations, prevents, to a degree, the use of catalyst, at a uniform high efficiency level. Most of these difficulties may be avoided by the use of a method wherein the catalyst or contact mass is handled continuously as well. The catalyst of this invention is particularly well adapted to such a process, although advantages over previous catalysts are noted in stationary bed operations.

This invention has for its preferred object the provision of a catalyst for a process of hydrocarbon oil conversion wherein a continuously moving stream of hydrocarbon oil is contacted with a continuously moving stream of catalyst for the accomplishment of conversion, in which the catalytic material is used only at a high level of efficiency, and in which the catalytic material is continuously regenerated and returned to the conversion step, both operations being conducted under controlled conditions.

In such operations, the term "gel" has been rather loosely applied to include both true gels and gelatinous precipitates. In forming pellets of either, the gel or precipitate has been caused to form completely and then subjected to suitable operation for the formation of particles. These have not been particularly satisfactory because the particles obtained are not resistant to losses by shock breakage and abrasion. The common operations include breaking a mass of gel into fragmentary particles and screening to separate particles of desired size. This results in the production of a considerable amount of fines which are a loss since they cannot be re-used in the same catalytic equipment. In some cases, the wet gel is molded. This requires expensive molding equipment and costly cleaning of molds. It is also proposed (Reissue Patent 21,690) to separate the mass into two parts, one of which is dried and crushed and the other used wet to bind the crushed portion in a molding operation which involves the usual objections to molding.

The present catalyst is prepared by a method which eliminates the heretofore necessary step of converting formed gel masses into a usable form by some type of pelleting operation. Another feature is that the gel contact masses are produced in spherical and/or spheroidal shapes. This form is ideal for any process in which a contact bed is utilized, whether it be of the stationary or the moving (or flowing) type of bed. Spherically-shaped particles can pack only in a uniform manner, hence, channeling of vapors or fluids flowing through this type of bed is impossible. For an operation in which a moving (or flowing) contact bed is employed, pellets of a spherical shape afford unique flow characteristics. The present catalyst is exceptionally hard and presents novel advantages over previously known catalysts apart from the spheroidal shape of the preferred form. This hardness is retained by particles produced by crushing the spheroids and, hence, broken pieces may be used within the scope of the invention as hydrocarbon conversion catalyst.

The above-mentioned process of forming the pellets involves continuously contacting within an enclosed mixing chamber such as an injector or nozzle mixer, streams of reactant solutions of such concentrations and proportions that no gelation occurs within the mixer, but only at some predetermined time after leaving the mixer, and under such conditions of flow that each stream is completely and uniformly dispersed within and throughout the other at the instant of contact. The resultant colloidal solution is ejected from the mixer through an orifice or orifices of suitable size so as to form globules of the solution which are introduced into a fluid medium where the globules of the colloidal solution set to a gel before they pass out of that medium. The fluid medium may be any liquid or combination of liquids which is immiscible with water such as, for example, petroleum naphtha, kerosene, hydrocarbon oils, etc. Pellets may also be formed by a process analogous to spray drying wherein the gelable solution is sprayed into a drying tower under conditions such that the particles of the solution set to a gel and are dried to about 10% to 50% water content. This process is claimed in my application Serial No. 461,453, filed October 9, 1942. The fluid medium may also be constituted of a gas such as air. Whether the fluid medium be gaseous or liquid, it is essential to the formation of a structurally strong pellet that the sol be not mechanically disturbed during the time of setting. Evaporation of water in the sol tends to generate steam which not only mechanically disturbs the gel structure during formation but also introduces gas bubbles of large size compared with the size of the pellet. The fluid medium should therefore be maintained at a temperature below the boiling point of the sol until the same has set to a firm hydrogel.

After setting is complete, the hydrogen may be washed, base exchanged, heat treated or otherwise processed to obtain the desired physical and chemical characteristics in the final product. Care is exercised, however, to avoid mechanical injury to the gel structure such as occurs in the conventional breaking up and/or milling of gels as manufactured prior to my invention. It will be seen therefore that the preferred embodiment of the invention involves maintaining the form of the material substantially constant from a time prior to gelation until after the gel has been dried. The extent of drying will depend somewhat on the use which it is desired to make of the product but in any event, the drying is carried to a stage beyond that at which shrinkage of the gel stops in order to produce the preferred product. As used herein, the term "substantial dryness' means more than merely dry in appearance or dry to the touch but refers to drying to such an extent that no more water is evolved at a temperature somewhat above the boiling point of water. At such temperatures, the gel possesses open pores free of liquid although it may contain a relatively small percentage of strongly adsorbed water which is evolved only at relatively high temperatures.

There are two alternative methods of liquid phase operation which are dependent upon the density of the fluid employed. When the density of the fluid is lower than that of water, the fluid is supported over a layer of water and the colloidal solution from the mixer is introduced at the top of the column of fluid; the height of the latter and the gelation time being adjusted so that gelation occurs within the fluid and before the globose particles reach the water surface. For a fluid more dense than water, the procedure is reversed; the colloidal solution is ejected into the bottom of the fluid, the globules rise up through the fluid, gel and pass into a layer of water which conducts the gel away for processing.

The shapes of the formed gel are dependent upon the rate at which the globules of the colloidal solution travel through the water-immiscible liquid; while the rate of movement of the globules depends upon the relative density and viscosity of the fluid medium employed. If the latter medium has a low viscosity and a density far removed from that of the colloidal solution, the globules of the latter solution will travel rapidly, hence, the gel pellets will assume flat or dis-like shapes. Examples of liquids in which pellets of this type may be produced are benzene, carbon tetrachloride, or petroleum naphtha A water-immiscible fluid medium having a high viscosity or a density close to that of the colloidal solution will effect slow movement of the globules of the latter solution and thus form spherically-shaped gel pellets. It is apparent from the above description that gel pellets of any shape, varying from flat-like discs to perfect spheres, may be manufactured by choice of a water-immiscible fluid medium having the proper density and viscosity.

The success of this process is due to the fact that the gelation time for a large number of materials can be controlled very accurately.

I have studied the preparation of many gels in which silica is the predominant component and found that the gelation time can be controlled so that the invention described above may be utilized in their preparation. The following is a list of the gels I have prepared by the methods described herein: silica gel, silica-alumina, silica-stannic oxide, silica-ceria, silica-thoria, silica-zirconia, silica-alumina-thoria, silica-alumina-zirconia, silica-alumina-stannic oxide, silica-alumina-ceria. Further, the methods described herein may be extended to the preparation of many other types of gels.

The time of gelation is dependent upon temperature, pH and concentrations of reactants. The higher the temperature, the shorter the time of gelation. At fixed concentrations of reactants the gelation time increases with decrease in pH provided the pH is within the limits of the invention. When the temperature and pH are constant, the gelation time decreases as the reactant solutions are made more concentrated. Considerations controlling gelation time are discussed in detail in my copending application Serial No. 461,455, filed October 9, 1942.

Briefly, the invention contemplates a catalyst pellet of generally rounded outline having uniform porosity, a hard surface and unusually high crushing strength. These pellets are better suited to stationary bed operation than conventional molded catalyst pellets because of their high resistance to breakdown in transportation and use; but their advantages are achieved to a very high degree when used in continuous processes involving constant exposure to forces tending to abrade and crush the pellets.

Other objects and advantages will be apparent from the detailed description below when considered in connection with the attached drawing wherein:

Figure 1 shows apparatus for use in preparing the catalyst;

Figures 2 and 3 show modified types of mixing nozzles for the apparatus of Figure 1;

Figure 4 is a modified type of apparatus for forming the pellets;

Figure 5 is an illustration of a group of pellets constituting the product claimed herein and showing the spheroidal shapes thereof.

Referring to Figure 1, a mixing nozzle, indicated generally at 10, is mounted at the top of a column of water-immiscible fluid in a tank 11. At the bottom of tank 11 is a layer of water which forms an interface 12 with the column of said fluid. Water is continuously supplied through inlet 13 and withdrawn through outlet 14. The interface at 12 is maintained by properly adjusting the height of conduit 9 in correlation with the density of the fluid medium and the rate at which water is supplied at 13. Vent 15 prevents siphoning action. The flow of water carries away the gel pellets through outlets 14 and 9 to suitable washing and treating stages. The water in which the pellets are carried away is itself a washing medium and may include any desired treating material to act as a treating stage.

The colloidal solution from which the pellets are formed is made up and admitted to the column of fluid by the mixing nozzle 10. Preferably, the apparatus will include a plurality of nozzles 10 in order to increase the capacity of the unit, but only one is shown here for purposes of simplicity. The nozzle 10 includes means for completely dispersing two solutions in each other and admitting a continuous stream of the so-formed colloidal solution below the surface 16 of the water-immiscible fluid, wherein the stream of the colloidal solution breaks up into globules. The colloidal solution or globules thereof may be dropped onto the surface of the fluid, but this tends to break them and impairs control over pellet size obtained by injecting the colloidal solution under the surface of the liquid. It must be borne in mind that considerable shrinkage takes place, not only by syneresis, but also during drying and processing. Control of globule size must take into account this shrinkage.

The size of the globules is controlled by the rate at which the colloidal solution flows through the nozzle orifice and the dimensions of the latter. A simple modification in controlling the size of the globules is the introduction of a baffle just outside of the nozzle mixer and in the stream of the colloidal solution. Furthermore, sizing is a matter of relative densities and viscosities of the colloidal solution and water-immiscible liquid.

Referring, now, to the operation of mixing nozzle 10, solutions to be mixed are metered accurately and then admitted through lines 17 and 18 to a chamber which has a rotor 19 rotated by shaft 20 at a speed of at least about 1700 R. P. M. from a source of power not shown. The rotor 19 is constructed from a rectangular bar of metal whose edges are rounded off in such manner that the walls of the mixing chamber serve as a guide for them. The rounded edges of the rotor are grooved; thus, efficient dispersion of both solutions in each other is maintained and gel formation is prevented in the mixing nozzle. The rotor may be fluted in any suitable manner or provided with other inequalities of surface to increase agitation in the mixing zone. Helical grooves for such purpose are shown on the rotor 21 of the modified form of mixing nozzle illustrated diagrammatically in Figure 2. The best operation of the mixing nozzle is realized when the velocities of the reactant solutions are so high that the time the latter solutions spend in the mixing chamber is only a very small fraction of the gelation time.

A further modification is the extremely simple mixer of Figure 3 wherein the rotor 22 is merely a shaft which may be fluted, grooved, etc.

Another modification that may be applied to any of the mixing nozzles illustrated in Figures 1, 2 and 3 is to provide means for injecting air into the solutions admitted to the mixing chamber or to the mixing nozzle itself. By this means, hydrogel pellets are obtained which contain numerous small bubbles of air which serve to make the processed dry gel less dense in nature and more porous.

The apparatus of Figure 4 is adapted for upward flow of the colloidal solution during gelation. In this case, the mixing nozzle 10 is positioned at the bottom of shell 11 which contains a column of water-immiscible liquid heavier than water, with water thereabove, the liquid-liquid interface being again indicated at 12. Water is admitted by a pipe 23 while water carrying gelled spheroids is withdrawn by discharge line 24.

A peculiar feature of the present gel pellets is their transparency—having the appearance of clear glass beads, in many cases. This appearance is retained only when silica is predominant, the transparency being lost as content of other oxides is increased to give translucent beads.

The present pellets are extremely hard and, due to this property and their smooth surfaces, are capable of resisting losses by attrition and shock in handling for periods many times longer than the molded pellets used heretofore.

Example I

A solution of sodium silicate containing 105 grams of $SiO_2$ per liter was prepared by diluting "N" brand of sodium silicate (28.7% $SiO_2$, 8.9% $Na_2O$). This solution was mixed with a second solution containing 34.10 grams of $Al_2(SO_4)_3$ and 25.05 grams of $H_2SO_4$ per liter at the ratio of 1.00 volume of the former solution to 0.780 volume of the latter. The resulting colloidal solution leaving the mixer through orifices was introduced into the top of a column of gas oil at room temperature whose depth was eight feet. The globules of solution fell through the oil and gelled before passing into the layer of water located beneath the oil. The gel in the globular form was conducted out of the bottom of the column in a stream of water and on removal from the water, it was washed with petroleum naphtha to remove oil from its surface. It was then washed with water and $NH_4Cl$ solution, to replace zeolitically held sodium ions by ammonium ions which are capable of being driven off as $NH_3$ gas by heat. The gel was dried slowly and uniformly at 180° F. until shrinkage was substantially complete and the drying was continued at a gradually-increasing temperature up to 1050° F. at which temperature it was maintained for two hours. The silica-alumina gel retained its spheroidal shape during the washing and drying operations. Alternatively, the hydrogel pellets may be dried without shrinkage by replacing the original liquid phase, water, by a liquid of relatively low critical temperature, such as alcohol, heating to the critical temperature while maintaining pressure sufficient to maintain the alcohol liquid and permitting vaporization of the alcohol at a temperature above the critical.

The time of gelation for the concentrations and proportions of reactants given above was about ten seconds, while the pH was 6.9. The gas oil employed was a fraction of Oklahoma City Gas Oil having a boiling range of 471° to 708° F. and a specific gravity of 0.846.

Example II

This example illustrates the use of chlorobenzene as a fluid medium and the mixing of reactants at such concentrations and proportions that the gelation time was approximately twenty seconds while the pH was 6.9. Since chlorobenzene has a density of 1.101, the colloidal solution was ejected into the bottom of a ten foot column of chlorobenzene at room temperature (see Fig. 4), the globules of solution rose through the fluid and gelled before passing into a layer of water contained over the chlorobenzene. The gel was washed and dried as described in Example I (the washing with petroleum naphtha was unnecessary here).

The sodium silicate solution contained 105 grams of $SiO_2$ per liter (prepared from "N" brand sodium silicate) while the second solution contained 27.10 grams $Al_2(SO_4)_3$ and 19.95 grams of $H_2SO_4$ per liter. These solutions were mixed at a ratio of 1.00 volume of the former solution to 0.980 volume of the latter.

Example III

This example illustrates the preparation of spherically-shaped silica gel pellets and the conversion of these into a cracking catalyst. The time of gelation for the concentrations and proportions of reactants given below was about thirty seconds while the pH was 5.7.

The apparatus shown diagrammatically in Figure 1 was employed in the manufacture of the silica hydrogel. A solution of sodium silicate containing 106.3 grams of $SiO_2$ and 33.0 grams of $Na_2O$ per liter, prepared by diluting "N" brand of sodium silicate, was metered accurately and admitted continuously to the mixing chamber by inlet 18 while a metered solution of 3.90 normal hydrochloric acid was continuously fed at inlet 17. The reactant solutions were mixed at a ratio of 3.34 volumes of the sodium silicate solution to 1.00 volume of the acid solution. The resulting colloidal solution leaving the mixer entered at the top of a nine-foot column of petroleum oil at room temperature having a viscosity of 305 Saybolt seconds and a density of 0.891. The globules of solution fell through the oil and gelled before passing into the layer of water located beneath the oil. The spherically-shaped hydrogel was conducted out of the bottom of the column 11 in a stream of water by means of conduits 14 and 9. The hydrogel was washed with benzene to remove the film of oil and then washed with water until free of sodium chloride. The washed hydrogel was soaked overnight in a 25% solution of $Al(NO_3)_3 \cdot 9H_2O$ and then the excess solution was poured off. The spherically-shaped silica hydrogel impregnated with aluminum nitrate was dried slowly at 180° F. until shrinkage was substantially complete and the drying was continued at a gradually-increasing temperature up to 1050° F. at which temperature it was maintained for two hours. The aluminum nitrate was converted to the oxide during the heating process, and thus a silica-alumina gel catalyst in the form of spherically-shaped pellets was obtained having good activity as a cracking catalyst.

The hydrogel globules prepared in Examples I, II and III were of about 5 millimeters in diameter and no difficulty was encountered in drying and shrinking these to their final form. It has been found, however, that with hydrogel globules of the order of 8 or 10 millimeters in diameter considerable cracking and splitting of the globules takes place when they are dried rapidly; this may be overcome by treating the globules with boiling water or steam for at least 15 to 30 minutes prior to drying.

The spherical pellets of Example I have been compared by hardness tests to pellets formed in conventional manner. A comparison on cracking efficiency shows the present pellets to have substantially the same effect as molded pellets and broken fragments. A silica-alumina hydrogel was prepared by mixing reagents of the same concentration and in the same proportions as in Example I. This was permitted to gel as a mass in conventional manner.

The hydrogel, after being washed, was divided into two portions, the one part was dried, then crushed to produce fragmentary pieces of the desired size; the other portion of the hydrogel was cast into molds and dried, thus forming small cylindrical pellets. These two forms of gel were subjected to a hardness test developed for cracking catalysts which consists of tumbling an 80 cc. sample of material in a one-pound grease can with one ⅜" x 3¼" Monel metal rod at 80 R. P. M. on a paint roller mill for a period of one hour, then screening the sample to determine the quantity which was powdered and broken down to a size smaller than the original. The fragmentary pieces of gel showed a breakdown of 12%, while the cylindrical pellets were broken down to the extent of 6%. The larger breakdown with the gel in the fragmentary form is probably due to the irregular shapes and to the stresses and fissures developed during the crushing operation.

The spherically-shaped gel in Example I under the above conditions of hardness test gave no powdering nor breakdown. Continuing the test for an additional 15 hours merely scratched the surface of the spheres, thus producing only a negligible amount of fines. Subjecting the gel to the hardness test for a total of eighty hours gave 0.3% of material which was smaller in size than the original. This pellets of this invention generally show losses under this test of less than 1% per hour, while the preferred pellets show losses less than 0.25% per hour.

The pellets of this invention may act as carriers for other material in the manner well known in the art.

The gel pellets of the present invention vary in size according to the degree of subdivision of the colloidal solution which is, in turn, a function of several variables, the most important being the manner of supplying the colloidal solution and surface tension at the interface between colloidal solution and the immiscible fluid to which it is supplied. Size of the pellets will also be affected by the manner of drying, it appearing that shrinkage during drying is due to capillary action at the meniscus of the liquid phase as it retreats through the porous gel structure. Pellets as large as desired can be prepared; but for most purposes, particularly for catalytic hydrocarbon conversion, maximum sizes are about 10 millimeters in diameter. Preferably, the pellets are about 3 to 7 millimeters in diameter, while present indications are that 5 millimeter particles are of general application.

For special requirements, much smaller pellets can be formed if desired. For example, in preparing a catalyst to be utilized in a process wherein the catalyst is suspended in the reactant gases, pellets having an average diameter less than 0.1 millimeter can be produced. Nozzles with small openings are preferably used where gelation occurs in a liquid medium. Thus, any of the nozzles illustrated may be reduced at the outlet or fitted with a plate across the outlet having a plurality of small holes. Small openings of this type may often give gel deposits inside the nozzle and require frequent cleaning. This effect is preferably avoided to a large extent by forming a colloidal solution which requires several minutes times for gelation at room temperature and passing that sol from the mixing nozzle to a body of oil at elevated temperature. The heating of the sol globules thus accelerates gelling to obtain practical gelling times while gelation in the nozzle is discouraged. Such a process is illustrated by the following example.

*Example IV*

A water glass solution was prepared by diluting 27.40 pounds of "N" brand of sodium silicate with 17.68 pounds of water. This solution contained 212 grams of $SiO_2$ per liter and 66 grams of $Na_2O$ per liter. A second solution was prepared by dissolving 387 grams of sodium aluminate in water to form ten liters of solution. These two solutions were mixed in batch form with efficient stirring in the ratio of 100 volumes of the former to 67.8 volumes of the latter.

The sodium aluminate-sodium silicate solution, immediately after preparation, was mixed in the nozzle mixer with a 1.224 normal hydrochloric acid in equal volumes to form a colloidal solution having a pH of 5.7 and a gelation time of three minutes at room temperature. The colloidal solution was extruded from the nozzle mixer into the top of a column of gas oil whose depth was twelve feet and which was maintained at a temperature of 95° C. The sol globules fell through the oil and gelled before passing into the layer of water located beneath the oil. Washing and drying of the hydrogel were conducted as described in Example I.

Example IV illustrates the preferred method of preparing pellets having diameters of less than 0.1 millimeter, however, pellets of any desired size may be prepared by this method. Colloidal solutions, prepared by the methods of this invention, having gelation times at room temperature of more than several minutes and as long as several hours may be converted into spheroidal pellets by preheating the sol for a predetermined length of time and then introducing it in the form of globules into a body of oil at an elevated temperature, wherein the sol globules gel. This process is illustrated in the following example.

*Example V*

The sodium aluminate-sodium silicate solution prepared as described in Example IV was mixed in the nozzle mixer with a 3.780 normal hydrochloric acid solution in the ratio of 100 volumes of the former soution to 32.6 volumes of the acid solution to form a sol having a pH of 3.4 and a gelation time of two hours at room temperature. The colloidal solution leaving the mixing chamber was pumped through a preheater which consisted of a pipe twisted into a coil and immersed in a bath maintained at 70° C. The sol remained in the preheater for 120 seconds before being introduced, in the form of globules, at the top of a column of gas oil which was twelve feet deep and was maintained at a temperature of 95° C. The globules of the colloidal solution fell through the oil and gelled before passing into the layer of water located beneath the oil. The hydrogel pellets were washed and dried as described in Example I.

Small particles are also obtained by crushing the pellets to any desired size. The present gels are found to retain their high hardnesses after such crushing and their high densities are also retained. Some change in apparent density is found due to closer packing of the particles. Under conditions of commercial operation there is a substantial proportion of product which is rejected, either because of size or because of cracking of the pellets. These rejects furnish a good source of hard gel for crushing.

The formation of pellets according to this invention in a gaseous medium is illustrated by the following example.

*Example VI*

An acid solution was prepared by mixing 3.5 parts by weight of sulfuric acid (100% concentration), 7.9 parts by weight of commercial iron free aluminum sulfate containing 15 mols of water per mol of salt, and 88.6 parts by weight of distilled water. A dilute water glass solution was prepared by mixing 44.7 parts by weight of distilled water and 55.3 parts by weight of "N" brand sodium silicate (28.7% $SiO_2$, 8.9% $Na_2O$). These solutions were mixed in a nozzle mixer of the type shown in the drawing in the ratio of 137 volumes of acid to 150 volumes of water glass thus forming a sol which sets in less than one second to a firm hydrogel containing 10 grams of silica and alumina per 100 grams of gel. Immediately upon mixing, the sol was ejected at room temperature through an orifice into enlarged vessel containing air at room temperature. The spray thus formed set to small spheroids of hydrogel which were collected in a pool of water at the bottom and after removal were washed, base exchanged with 3% aluminum sulfate solution, again washed and dried as in the previous examples. The product was small hydrogel beads having a cracking activity of 52.7% as hereinafter defined and having physical properties, other than size, substantially the same as that of the larger beads formed in liquid according to the previous examples.

The pellets are generally spheroidal in shape, usually being somewhat flattened to forms approximating ellipsoids. The irregularity of the shapes and sizes under methods of commercial production are strongly reminiscent of the rounded pebbles in the bed of a water course; though the pellets are, of course, much smaller. For that reason, the best definition of shape seems to be "rounded pellets" designating solids which are bounded substantially solely by smooth curves, and having substantially no plane or angular faces. The surfaces of the pellets, in addition to being made up of smooth curves, are usually inherently smooth themselves; being similar to a glass in smoothness and luster at surfaces resulting from formation as contrasted with fracture surfaces. The resemblance to glass is further intensified by the nature of the fracture and the power to transmit visible light. The fracture is characteristically conchoidal and the pellets are transparent to translucent, depending upon the mode of formation; i. e., concentration and pH of colloidal solution, history of treatment, etc. This is in marked contrast to the molded synthetic gel pellets which are essentially chalky in appearance and physical characteristics, although a little harder than chalk.

The surfaces (both original and fracture surfaces) of the present pellets are extremely hard in view of the chemical and physical nature thereof. Precipitated silica is normally soft and the highly porous nature of the pellets leads to an expectation that the pellets would have easily scratched surfaces. Surprisingly, the surfaces have hardnesses on the order of that of glasses. The preferred types vary in hardness from slightly less than 4 on Mohs' scale to 6 and harder. Pellets are readily obtained on a commercial scale capable of scratching annealed glass such as "Pyrex." The advantages of such hardness are obvious, particularly when coupled, as in the present case, with a smooth surface. When used for catalytic conversion of hydrocarbons, for example, particles of catalytic material are either packed in a stationary bed, passed continuously as a moving column through a treating chamber or suspended in the gaseous material to be contacted. In the continuous processes, the particles are in constant motion and subjected to constant abrasion. Smooth, hard surfaces, such as those of the present pellets, resist abrasion; while the soft rough surfaces of the particles used by the prior art break down rapidly, producing undesired fines and using up the catalyst. Even in stationary bed operation, the pellets are subjected to destructive forces. The pellets must be transported to and placed in the apparatus and during operation, flowing gases and fluctuating pressures result in the motion of portions of the contact bed and by these means produce undesirable attrition.

The strength of the pellets is extremely high. Individual particles, prepared in the manner described above, support well over 50 pounds. This is determined by placing a single pellet on an anvil and applying force directly to the upper surface of the pellet until it crushes. Individual pellet strengths in excess of 100 pounds are preferred and strengths of 350 pounds are not unusual in normal pellets prepared as described. A contrast with molded pellets of the same chemical composition is helpful. As compared commercially, these molded pellets crush under a weight of about 5 pounds. By molding under high pressure, it is possible to achieve a strength of about 20 pounds maximum; but pressure molding is not commercially feasible. The crushing strength of the pellets in mass is also extremely high. Normal pellets of this invention will withstand (in mass) pressures upwards of 1000 pounds per square inch and it is preferred that the mass of pellets be capable of withstanding at least 2000 pounds per square inch. Batches have been prepared of pellets which, in mass, withstand pressure of 3000 pounds per square inch or more. For purposes of comparison, it is noted that commercial molded silica gel catalyst in mass crushes under pressures of 500 pounds per square inch, while fragmentary particles of silica gel catalyst in mass crush under pressures of 100 pounds per square inch.

The hardness and strength of the present catalyst is further illustrated by results of an impact test wherein catalyst is carried by an air stream through a tube to be projected against a vertical steel plate. Fines are withdrawn upwardly while catalyst of larger size drops into a hopper to be returned to the air stream. Fifteen hours of recycling the catalyst in this manner produced 46% of fines from typical molded catalyst while none of the catalysts according to this invention produced more than 5% of fines. The preferred catalysts show extremely small losses; for example, 0.1% in the case of the catalyst of Example I.

Internally, the present gel pellets have substantially the structure of the original hydrogel with the liquid phase removed. The size of the pellet is, of course, reduced in normal drying and the structure is probably slightly deformed to a degree commensurate with deformation of the pellet as a whole. For all practical intents and purposes, however, the original gel structure is completely retained by the dried pellets. It is a necessary corollary of this fact that the finished gel pellets are uniformly porous as contrasted with molded pellets wherein some portions are badly deformed by the molding operation to largely eliminate a portion of the porous structure.

The apparent density of the product varies in the same direction as the crushing strength, but the strength is not simply a function of apparent density. By the term "apparent density," reference is made to weight, as compared with the volume occupied by a mass of the particles.

It is determined by weighing a fairly large volume of particles. For example, a large diameter graduated cylinder is filled to a volume calibration and the weight of pellets determined by difference in weight of the graduate before and after filling with pellets. In general, apparent density of the present pellets varies between 0.5 and 1.1 grams per cc. Lighter pellets having apparent densities as low as 0.3 gram per cc. can be prepared but their hardness and crushing strength are low. Apparent densities above 0.7 gram per cc. are preferred. By comparison, molded gel catalyst usually has an apparent density around 0.55 gram per cc. Higher densities, up to about 0.75 gram per cc. are possible with high pressure molding. An interesting interdependence of apparent density and composition of the gel pellets has been noted. When silica-alumina gels are prepared by mixing sodium aluminate, water glass and a mineral acid, increased apparent densities permit lowering of the alumina content for equal activities. Strangely, this rule does not apply if the colloidal solution to be gelled is obtained by mixing aluminum sulfate and water glass to obtain a collodial solution of the same pH, silica content and alumina content. The table below shows the strange relationship noted above. The table shows activities and composition in percent by weight on a dry basis of a number of

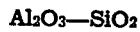

gel catalyst pellets prepared by mixing sodium aluminate, water glass and sulfuric acid.

Table

| Catalyst composition | | App. density of catalyst | Activity |
| --- | --- | --- | --- |
| Al₂O₃ | SiO₂ | | |
| 3.0 | 97 | 0.440 | 25 |
| 5.0 | 95 | 0.465 | 35 |
| 10.0 | 90 | 0.695 | 50 |
| 2.0 | 98.0 | 0.802 | 50 |
| 2.5 | 97.5 | 0.780 | 48 |
| 2.5 | 97.5 | 0.897 | 48 |
| 3.0 | 97.0 | 0.838 | 47 |

The "activity" of the catalyst is a measure of its capacity to catalyze conversion of hydrocarbons and is expressed here as the percentage conversion of Oklahoma City Gas Oil having an A. P. I. gravity of 35.8 and a boiling range of 471° to 708° F. to gasoline having an end point of 410° F. by passing vapors of the said gas oil through the catalyst at 800° F., substantially atmospheric pressure and a feed rate of 1.5 volumes of liquid oil per volume of catalyst per hour for ten minute runs between regenerations.

The activity is a relative property which can be defined accurately only with respect to a specific conversion at specified conditions. Thus, on the basis of the defined test, suitable catalysts in general will have activities of not less than about 5%. Obviously, a 5% conversion to gasoline is not a good commercial process, but the test is not intended to indicate maximum or minimum activity; but rather to afford a basis for comparison of catalysts. It would be extremely difficult to evaluate activity on any other basis, since conversion varies with nature of the charging stock and conditions of treatment. In general, conversion of gas oil to gasoline increases with increased temperature or pressure. A "low-activity" catalyst usually gives reasonably good yields at more drastic conditions. A typical catalyst of low activity on the basis of the present test is a silica-alumina catalyst having an activity of 5% in the above arbitrary test. But at 900° to 950° F. conversion to gasoline on the order of 30% may be achieved with the same charging stock, pressure and rate.

Hydrocarbon conversion catalysts should have activities of about 5% or better in the above test, while for general purposes (i. e., use over the whole range of conversion conditions) catalysts of at least 20% activity are desirable. It is preferred that the catalyst have an activity of not less than 40%.

Density of the catalyst is an important property in itself for many uses. In any type of catalytic conversion of hydrocarbons, some of the solid catalyst is carried by the converted vapors. When using the preferred pellet catalyst of this invention as a bed, either stationary or moving, the amount of fines so carried is extremely small and may often be permitted to pass with the vapors for collection with residual tarry material after separation of lighter, more valuable hydrocarbons. However, if it is desired to separate fines so carried, or in processes where the catalyst is suspended in the vapors, separation is a major problem. The high densities of the preferred catalysts of this invention permit of ready separation of finely divided material. These preferred catalysts have apparent densities in excess of about 0.7 gram per milliliter.

Another effect of density is in controlling temperatures of the catalyst mass in use. In regenerating spent hydrocarbon conversion catalysts, carbonaceous deposits are burned off with preheated air. Provision must be made for some means to abstract heat from this highly exothermic reaction to prevent damage to the catalyst. The more dense catalysts have a higher heat capacity per unit volume and are thus able to absorb more heat themselves without suffering heat damage, thus decreasing the load on other heat-controlling means in the system.

I claim:

1. The process of forming inorganic oxide pellets having adsorbent and catalytic properties which comprises forming a hydrosol or inorganic oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, washing the spheroidal hydrogel and drying the washed hydrogel.

2. A body of catalyst pellets comprising hard homogeneous porous dried gel particles bounded by smooth hard glossy surfaces consisting substantially of smooth curves and characterized by a high resistance to attrition loss, said particles having been produced by the process of claim 1.

3. The process of forming inorganic oxide hydrogel pellets which comprises forming a hydrosol of inorganic oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs and retaining in said globules substantially all the constituents of said sol until gelation occurs.

4. The process of forming inorganic oxide hydrogel pellets which comprises forming a hydrosol of inorganic oxide including silica characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs and retaining in said globules substantially all the constituents of said sol until gelation occurs.

5. The process of forming inorganic oxide hydrogel pellets which comprises forming a hydrosol of inorganic oxide including silica and alumina characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs and retaining in said globules substantially all the constituents of said sol until gelation occurs.

6. The process of forming inorganic oxide gel pellets which comprises forming a hydrosol of inorganic oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, and thereafter drying the spheroids of hydrogel.

7. Hard homogeneous porous dried gel particles bounded by smooth hard glossy surfaces consisting substantially of smooth curves and characterized by a high resistance to attrition loss, said particles having been produced by the process of claim 6.

8. The process of forming inorganic oxide gel pellets which comprises forming a hydrosol of inorganic oxide including silica characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, and thereafter drying the spheroids of hydrogel.

9. Hard homogeneous porous dried gel particles containing silica bounded by smooth hard glossy surfaces consisting substantially of smooth curves and characterized by a high resistance to attrition loss, said particles having been produced by the process of claim 8.

10. The process of forming inorganic oxide gel pellets which comprises forming a hydrosol of inorganic oxide including silica and alumina characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spherical shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, and thereafter drying the spheroids of hydrogel.

11. Hard homogeneous porous dried gel particles containing silica and alumina bounded by smooth hard glossy surfaces consisting substantially of smooth curves and characterized by a high resistance to attrition loss, said particles having been produced by the process of claim 10.

12. The process of forming inorganic oxide gel pellets which comprises forming a hydrosol of inorganic oxide including silica and a metal oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, and thereafter drying the spheroids of hydrogel.

13. Hard homogeneous porous dried gel particles containing silica and a metal oxide bounded by smooth hard glossy surfaces consisting substantially of smooth curves and characterized by a high resistance to attrition loss, said particles having been produced by the process of claim 12.

14. The process of forming inorganic oxide gel pellets which comprises forming a hydrosol of inorganic oxide including silica and alumina characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, washing the hydrogel spheroids with water to remove water soluble salts, base exchanging the spheroids with a solution containing a cation capable of replacing alkali metals and drying the washed and base exchanged spheroids.

15. Hard homogeneous porous dried gel particles containing silica and alumina bounded by smooth hard glossy surfaces consisting substantially of smooth curves and characterized by a high resistance to attrition loss, said particles having been produced by the process of claim 14.

16. The process of forming inorganic oxide gel pellets which comprises forming a hydrosol of inorganic oxide including silica and a metal oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, washing the hydrogel spheroids with water to remove water soluble salts, base exchanging the spheroids with a solution containing a cation capable of replacing alkali metals and drying the washed and base exchanged spheroids.

17. Hard homogeneous porous dried gel particles containing silica and a metal oxide bounded by smooth hard glossy surfaces consisting substantially of smooth curves and characterized by a high resistance to attrition loss, said particles having been produced by the process of claim 16.

18. The process of forming inorganic oxide gel pellets which comprises forming a hydrosol of inorganic oxide characterized by an inherent capacity to set to a hydrogel upon the lapse of a suitable period of time without addition to or subtraction from said sol of any substance, admitting said sol in the form of separate globules to a body of a liquid medium substantially immiscible with water in which said globules assume spheroidal shape due to surface tension at the interface between said sol and said liquid medium, said medium being maintained at a temperature below the boiling point of said sol, retaining said spheroidal globules in said medium until gelation occurs, retaining in said globules substantially all the constituents of said sol until gelation occurs, washing the spheroidal hydrogel and drying the washed hydrogel.

19. The process of forming inorganic oxide gel pellets which comprises forming a hydrosol of inorganic oxide including silica characterized by an inherent capacity to set to a hydrogel upon the lapse of a suitable period of time without addition to or subtraction from said sol of any substance, admitting said sol in the form of separate globules to a body of a liquid medium substantially immiscible with water in which said globules assume spheroidal shape due to surface tension at the interface between said sol and said liquid medium, said medium being maintained at a temperature below the boiling point of said sol, retaining said spheroidal globules in said medium until gelation occurs, retaining in said globules substantially all the constituents of said sol until gelation occurs, washing the spheroidal hydrogel and drying the washed hydrogel.

20. The process of forming inorganic oxide gel pellets which comprises forming a hydrosol of inorganic oxide including silica and alumina characterized by an inherent capacity to set to a hydrogel upon the lapse of a suitable period of time without addition to or subtraction from said sol of any substance, admitting said sol in the form of separate globules to a body of a liquid medium substantially immiscible with water in which said globules assume spheroidal shape due to surface tension at the interface between said sol and said liquid medium, said medium being maintained at a temperature below the boiling point of said sol, retaining said spheroidal globules in said medium until gelation occurs, retaining in said globules substantially all the constituents of said sol until gelation occurs, washing the spheroidal hydrogel and drying the washed hydrogel.

MILTON M. MARISIC.

CERTIFICATE OF CORRECTION.

Patent No. 2,384,946. September 18, 1945.

MILTON M. MARISIC.

It is hereby certified that error appears in the printed specification of the above numbered patent requiring correction as follows: Page 7, second column, line 47, claim 1, for "or" read --of--; and that the said Letters Patent should be read with this correction therein that the same may conform to the record of the case in the Patent Office.

Signed and sealed this 9th day of April, A. D. 1946.

Leslie Frazer (Seal) First Assistant Commissioner of Patents.